United States Patent

Piana

[11] 4,389,925
[45] Jun. 28, 1983

[54] BEVERAGE EXTRACTING AND DISPENSING MACHINE

[75] Inventor: Giuseppe S. Piana, Milan, Italy

[73] Assignee: UNOPER S.r.l., Attinara, Italy

[21] Appl. No.: 272,240

[22] Filed: Jun. 10, 1981

[30] Foreign Application Priority Data

Jun. 11, 1980 [IT] Italy .................. 22723 A/80

[51] Int. Cl.³ ............................................. A47J 31/30
[52] U.S. Cl. .................................. 99/289 R; 99/295; 99/302 P
[58] Field of Search .............. 99/289 R, 289 P, 295, 99/297, 300, 302 R, 302 P; 222/129.1

[56] References Cited

U.S. PATENT DOCUMENTS

| | | | |
|---|---|---|---|
| 3,266,410 | 8/1966 | Novi | 99/302 P |
| 3,327,614 | 6/1967 | Bridges | 99/302 P |
| 3,604,335 | 9/1971 | Lafitte | 99/302 P |
| 3,754,463 | 8/1973 | Vernooy | 99/302 R |

*Primary Examiner*—Robert W. Jenkins
*Attorney, Agent, or Firm*—Sughrue, Mion, Zinn, Macpeak and Seas

[57] ABSTRACT

A beverage extracting and dispensing machine for use with flattened round cartridges, which contain a brewable product, such as ground coffee, freeze-dried coffee, tea, broth and the like. The cartridges have permeable upper and lower walls and a substantially cylindrical sidewall.

A cartridge may be slid to a brewing station in which it is laterally embraced by opposite clamping jaws. During its movement to the brewing station a new cartridge spreads the jaws apart and pushes an old cartridge away from the brewing station. The spreading apart of the jaws starts an automatic brewing cycle at the beginning of which a presser plate is lowered onto the cartridge and presses it with a tight seal on an underlying fixed support while the cartridge is laterally clamped by the jaws. Then a predetermined amount of hot water under pressure is flowed into the cartridge from a passage in the presser plate and the beverage is dispensed from the cartridge through a passage in the support to fill an underlying cup or similar container.

8 Claims, 8 Drawing Figures

BEVERAGE EXTRACTING AND DISPENSING MACHINE

BACKGROUND OF THE INVENTION

The present invention relates to beverage extracting and dispensing machines for use with flattened round cartridges containing ground coffee or other brewable products such as freeze-dried coffee, tea, broth and the like.

Cartridges of this kind, which have recently come into usage, comprise a hollow body with a substantially cylindrical sidewall and upper and lower endwalls. The upper and lower endwalls are grid-like, perforate or porous to be permeable to water, while the sidewall is imperforate and substantially rigid. The cartridge body is economically made of a plastics material adapted for use with foodstuffs.

Cartridges of the above kind are sold in sealed packages of the blister type which have the advantage of being highly hygienical. These packages are usually in the form of strips having a series of blisters each of which contains a single cartridge.

The cartridges are adapted for use in more or less conventional, manually operated espresso machines, but also in automatic, coin-operated brewing machines. In the latter case the cartridges must be unpacked prior to being stacked in a magazine inside the machine cabinet. The unpacked cartridges in the magazine are exposed to dirt and contamination.

Moreover, the existing coin-operated brewing machines are rather complicated and costly, since they incorporate, in addition to a brewing assembly, a transfer mechanism for transferring each time a new cartridge from the magazine to a brewing station and a used cartridge from the brewing station to a waste receptacle. They also incorporate control means which are operated by the insertion of a coin to cause the transfer mechanism and the brewing assembly to accomplish the respective working cycles in order to dispense the beverage.

An example of a transfer mechanism of the above kind is disclosed in German Offenlegungsschrift No. 26 07 612 published Sept. 1, 1977.

Coin-operated brewing machines requiring the insertion of a cartridge by the user in addition to the insertion of a coin or token to start their operation could incorporate less complicated mechanisms. However, such machines would be impractical from the users' point of view.

OBJECT OF THE INVENTION

The object of the invention is to provide a brewing machine for use with cartridges of the above kind which is adapted to be operated by the simple insertion of the cartridge proper into a brewing station, and which is of a very simple construction, without complicated cartridge transfer mechanisms.

The scope of the invention is defined by the attached claims.

In a machine according to the invention the cartridges themselves may be used as tokens or 'coins' to start an automatic brewing cycle.

Users may purchase the cartridges in their packages in which the cartridges are sealed in hygienical conditions and a cartridge at a time may be taken away from the package for its immediate use in the brewing machine.

DRAWINGS

The invention may be better understood by reading of the description which follows, made with reference to the accompanying drawings, in which:

FIG. 1 is a perspective view of a cartridge adapted for use in an automatic beverage extracting and dispensing machine according to the invention, FIG. 2 is a perspective view of a beverage extracting and dispensing machine according to a preferred embodiment of the invention, FIG. 3 is a cross-sectional view in the plane indicated by III—III in FIG. 2, with the brewing assembly in the rest position, FIG. 4 is a fragmentary cross-sectional view, in an enlarged scale, of the brewing assembly in the working position, the figure also diagrammatically showing the water and electric systems of the machine, FIG. 5 is a perspective detail view which shows i.a. a support plate, cartridge-clamping jaws and a lower portion of the brewing assembly of the machine, and FIGS. 6 to 8 are plan views from above which diagrammatically show the parts of FIG. 5 in three different conditions.

DESCRIPTION OF THE PREFERRED EMBODIMENT

Figure 1:
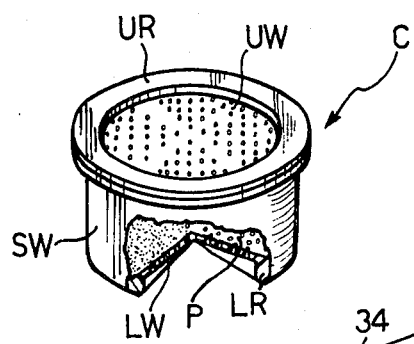
Figure 4:
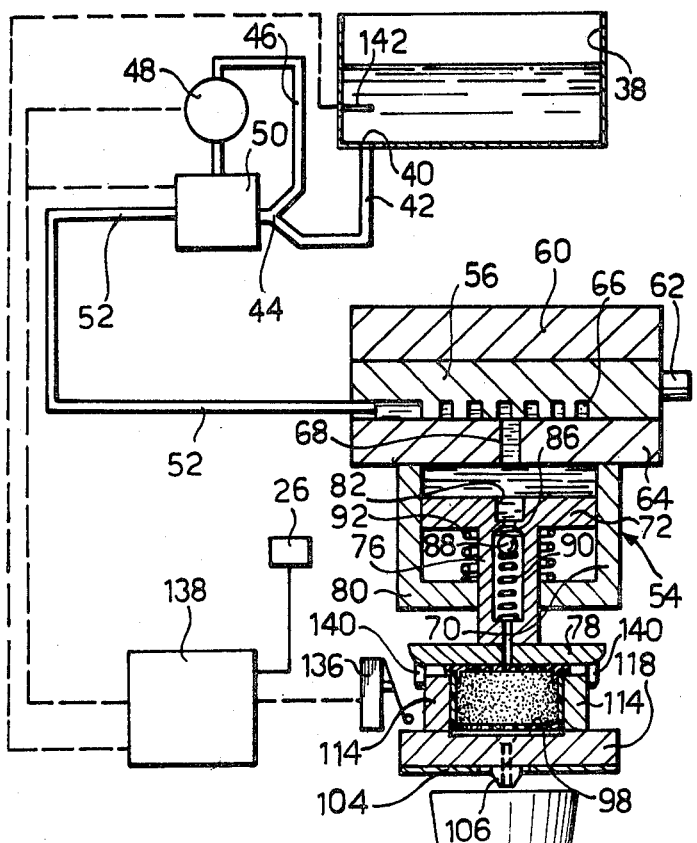

Referring to FIGS. 1 and 4, a cartridge C has a hollow body made of a plastics material adapted for foodstuffs. The body comprises an imperforate, substantially cylindrical sidewall SW, an upper wall UW and a lower wall LW. Both the upper and lower walls are substantially flat and are bordered by respective projecting sealing upper and lower rims UR, LR.

Both the upper and lower endwalls, UW, LW are grid-like or may have perforations of another kind or a suitable porosity. The cartridge body contains a brewable product P from which a beverage can be obtained by flowing hot water under pressure therethrough.

Figure 2:
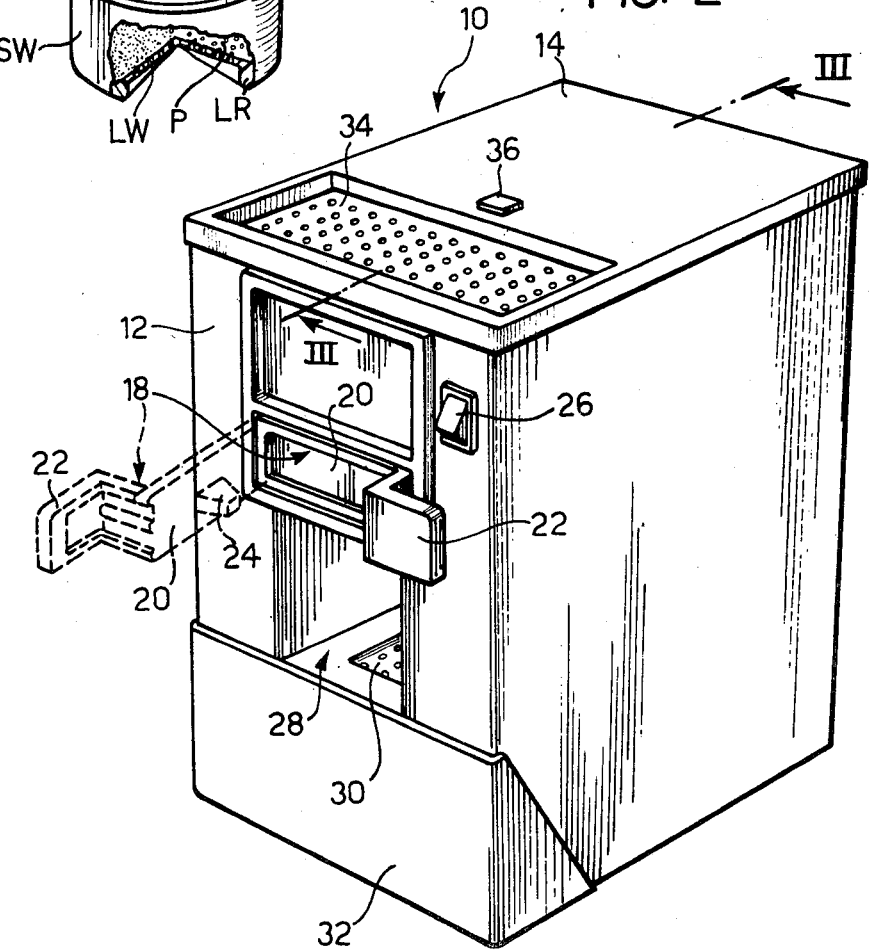
Figure 3:
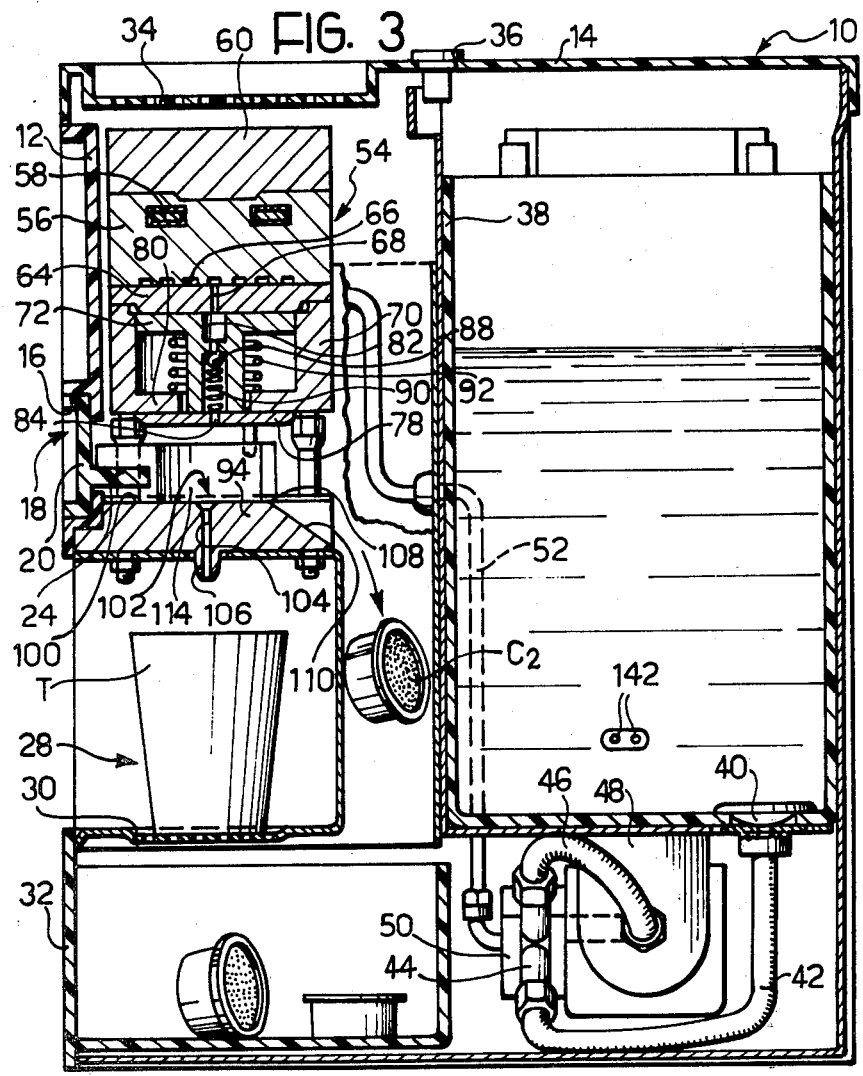

Referring now to FIGS. 2 and 3, an automatic beverage extracting and dispensing machine according to the invention has a cabinet generally indicated by 10.

The cabinet includes i.a. a front wall 12 and a removable upper wall or lid 14. The front wall 12 has a horizontally elongated rectangular window 16. The window 16 may be closed by a lever arm in the form of a flap 18, the left end of which, as viewed in FIG. 2, is hinged about a vertical axis to the front wall 12 on the corresponding side of the window 16.

The hinged flap 18, which is advantageously a moulded plastics piece, comprises an elongated rectangular portion 20 which is adapted to fit into the window 16 to close the latter, and a staggered portion 22 which may be used as a handgrip to manually open and close the flap 18.

The flap 18 has, between its ends, an integrally formed projection 24 which is adapted to penetrate into the cabinet 10 for the purpose which will be made clear below.

A start-stop push-button switch 26 is mounted on the front wall 12. The push-button of the switch 26 may be of transparent plastic material and a warning lamp may be incorporated in the switch to indicate when the machine is ready for use.

A receptacle 28 extends in the cabinet 10 from the front wall 12 under the window 16 and has a perforated bottom wall 30 on which a cup, tumbler or similar container T may be placed to receive a beverage, as it will be explained below.

The cabinet 10 is provided with a waste receptacle in the form of a drawer 32 which underlies the bottom wall 30 of the receptacle 28 and which is adapted to collect wasted beverage or water dripping from the bottom wall 30. The drawer 32 is also adapted to receive used cartridges dumped from the brewing station of the machine (see below).

The upper wall 14 of the cabinet 10 has a front apertured vent portion 24 for the escape of vapours leaking from the brewing assembly.

The upper wall 14 is removable from the cabinet and may be secured thereto by means of a key-lock 36.

Referring now to FIGS. 3 and 4, the rear portion of the cabinet 10 contains a water tank 38 which is removable for cleaning purposes. The tank 38 may be filled with cold water after removal of the upper wall or lid 14.

The water tank 38 has a bottom outlet 40 which is connected by a flexible conduit 42 to one of the arms of a Y pipe fitting 44. The other arm of the Y fitting 44 is connected by a flexible conduit 46 to the inlet of a motor-driven pump 48. The leg of the Y fitting 44 is connected to one of the outlets of a three-way solenoid valve 50, as better shown in FIG. 4. The two arms of the Y fitting 44 are in permanent communication with each other.

The outlet of the pump 48 is connected to the inlet of the solenoid valve 50. The other outlet of the solenoid valve 50 is connected by a flexible feed conduit 52 to the inlet of a brewing assembly, generally indicated by 54.

The brewing assembly 54, which is mounted in the cabinet 10 under the apertured wall portion 34, comprises heating means in the form of a heating metal plate 56. An electric heating resistance 58 is incorporated, in a known manner, in the heating plate 56. To the upper face of the heating plate 56 there is affixed a metal block 60 which has the function to increase the thermal capacity of the plate 56.

The resistance 58 has associated thereto a thermostatic switch 62 which opens when the temperature of the plate 56 raises above a predetermined value (for example 90° C.).

The lower face of the heating plate 56 is sealingly clamped to the upper face of a head-plate 64. The lower face of the heating plate 56 has a labyrinth groove therein which, together with the upper face of the head-plate 64, defines a labyrinth passage 66 whose inlet is connected to the feed conduit 52. The head-plate 64 has a central vertical passage 68 which constitutes the outlet from the labyrinth passage 66.

The head-plate 64 constitutes the upper end of a vertical cylinder 70. A flattened piston 72 is sealingly slidable in the cylinder 10. The passage 68 opens above the piston 72.

The piston 72 has a depending integral hollow stem 76.

A presser plate 78 is affixed to the lower end of the stem 76 under a lower endwall 80 of the cylinder 70 through which the stem 76 extends.

A coaxial passage 82 vertically extends from the upper face of the piston 72 and opens in the centre of the lower face of the presser plate 78 through an orifice 84. A valve seat 86 in the passage 82 is controlled by a ball check valve 88 which is biassed against the seat by a coil spring 90 in the passage 82. The piston 72 and the presser plate 78 are biassed upwardly by a coil spring 92 which is interposed between the piston 72 and the lower endwall 80.

Referring now to FIGS. 3 to 7, a fixed support in the form of a metal support plate 94 is mounted in the cabinet 10 under the presser plate 78. The support plate 94 has a flat upper face 96 with a shallow slot or channel 98 therein. The width of the channel 98 corresponds to the diameter of the cartridges as C (FIG. 1) to be used in the brewing machine.

The channel 98 is perpendicular to the front wall 12 of the cabinet 10 and has a leading section 100 which is located just behind the window 16. An intermediate section of the channel 98 defines a brewing station 102 which is vertically aligned under the orifice 84 of the presser plate 78. The support plate 94 has a vertical outlet passage 104 which is in vertical alignment with the orifice 84 and which opens in the receptacle 28 through a dispensing nozzle 106 which is integrally formed with the plate 94.

At its end opposite to the leading section 100 the channel 98 has a trailing edge 108 which is followed by a chute 110. As it will be explained below, a used cartridge may be dumped over the edge 108 and along the chute 110 into the underlying drawer 32.

The support plate 94 has a pair of upright pivot pins 112 which are located near the leading section 100 of the channel 98 and each on a respective side of the channel. A pair of clamping jaws 114 are hinged each on a respective pin 112 by means of a respective tail portion 116. The jaws 114, which are mirror images of each other, are symmetrically disposed with respect to the longitudinal axis of the channel 98. Each jaw 114 has a flat lower surface 118 (FIG. 4) which slidably rests on the respective portion of the flat surface 96 which lies on the respective side of the channel 98.

The clamping jaws 114 have respective concave surfaces 120 which are substantially semi-circular. A respective hairpin spring 122 is associated to each jaw 114 and has a coiled portion 124 around the pivot pin 112 and straight end portions or whiskers 126, 128. The end portion 126 resiliently bears against a fixed abutment which is constituted by the inner surface of the front wall 12 and the other end portion 128 resiliently bears against an outer surface 130 of the respective jaw 114.

Figure 5:
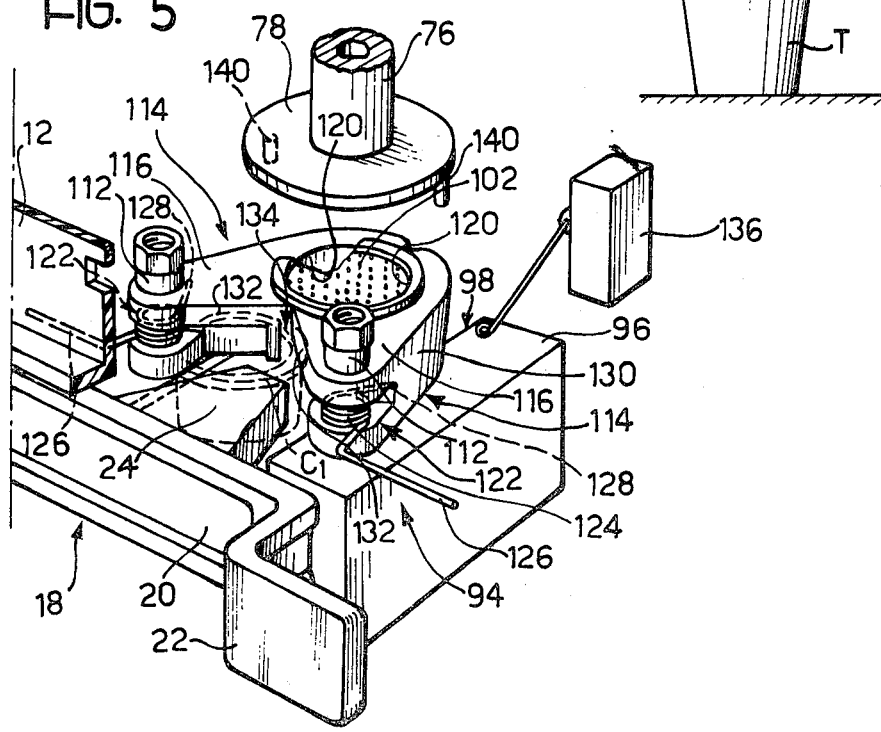

The two jaws 114 are biassed towards each other by the springs 122, i.e. to the closed position FIGS. 5 and 6. In the closed position of the jaws 114, the two concave surfaces 120 define a cylindrical seat which constitutes the brewing station proper 102 and which is concentrical to the axis of the outlet passage 104. The diameter of the seat closely corresponds to the outer diameter of the cartridges to be used in the machine.

The tail portions 116 of the jaws 114 have respective bevelled cam surfaces 132 which are turned towards the leading section 100 of the channel 98. When the jaws 114 are in the closed position, the cam surfaces 132 define a V-shaped mouth which communicates with the brewing station 102 through a gap 134.

Sensing means in the form of a microswitch 136 are associated to one of the jaws 114 (the right jaw in FIGS. 5 to 7) to sense the spread apart condition of the jaws (FIG. 7).

Other details of the brewing machine will appear in the course of the description which follows of its operation.

Referring to FIGS. 5 and 6, when a user wishes to obtain a beverage, he places a container T, for example, a plastics disposable cup, onto the bottom wall 30 of the receptacle 28. Then the user opens the flap 18 and places a new cartridge to be used onto the leading section 100 of the channel 98, through the window 16. The new cartridge in this position is shown in FIGS. 5 and 6 and is indicated by C1.

Then the user closes the flap 18 as indicated by the arrow A1 in FIG. 6. The projection 24, which acts as a pusher member, engages the sidewall of the cartridge C1 and pushes the latter against the cam surfaces 132.

The cartridge C1, under the thrust of the pusher member 24, slides along the channel 98 in the direction of the arrow A2, this movement being guided by the sidewalls of the channel 98.

The cartridge C1 exerts a camming action on the cam surfaces 132, spreads the jaws 114 apart to the position of FIG. 7 and opens the entrance gap 134.

The length of the pusher member 24 is such that, when the flap 18 reaches the fully closed position of FIGS. 1 and 8, the cartridge C1 is exactly located in the brewing station 102. In this condition the jaws 114 are closed under the bias of the springs 122 and their concave surfaces 120 closely embrace the sidewall of the cartridge C1.

Usually a used or old cartridge C2 has been left in the brewing station 102 from a preceding brewing cycle, as shown in FIG. 6. The new cartridge C1 pushes the old cartridge C2 away from the brewing station 102 in the direction of the arrow A2. The old cartridge C2 is thus slid over the trailing edge 108 and along the chute 110 and is dropped into the drawer 32, as shown in FIG. 3.

The spreading apart of the jaws 114, when a new cartridge C1 comes to the brewing station 102, is sensed by the microswitch 136 which starts the operation of a timer control unit 138, shown in FIG. 4.

Reference will be made now specifically to FIG. 4. After a short delay to make sure that the new cartridge C1 is correctly located and clamped by the jaws 114 in the brewing station 102, the timer control unit 138 starts the water pump 48 and opens the three-way solenoid valve 50 to the conduit 52. Water under high pressure (about 8 to 9 bars) is thus flowed from the tank 38 to the labyrinth 66 of the heating plate 56 and then through the passage 68 to the upper side of the piston 64. The water which flows in the labyrinth 66 is heated to a rather high temperature (about 80° to 90° C.). The water pressure on the piston 72 thrusts the latter downwardly. The check valve 88 is so calibrated to block the passage 82 during the descent of the piston 72.

The downward movement of the piston 72, which takes place against the bias of the spring 92, lowers the presser plate 78 until the latter comes to a lowered position in which it bears firmly on the upper face of the cartridge C1, or better on its upper sealing rim UR (FIG. 1). At the same time, the lower face of the cartridge C1, or better its lower sealing rim LR (FIG. 1), is tightly pressed against the bottom surface of the channel 98 in the brewing station 102 and around the entrance of the passage 104.

When the piston 72 and the presser plate 78 have come to a stop in the lowered position, the water pressure on the piston 64 abruptly increases and opens the check valve 88. Thus a water flow rushes into the cartridge C1 through the orifice 84 and the brewing of the product in the cartridge takes place. The beverage so obtained is forced from the lower face of the cartridge through the passage 104 and is dispensed into the container T.

After a predetermined time, corresponding to the dispensing of a predetermined amount of beverage into the container, the control unit 138 operates the three-way solenoid valve 50 to block the feed conduit 52 and to put the outlet of the pump 48 into communication with the pipe fitting 44 through which the residual water flow is sent back to the tank 38. In this manner, the water inflow to the brewing unit 54 is abruptly stopped, thus avoiding any further dripping from the nozzle 106.

Then the control unit 138 stops the pump 48. Meanwhile the water pressure has dropped above the piston 72, the check valve 88 has blocked the passage 82 and the piston 72 and the presser plate 78 have returned to the raised position of FIG. 3.

When brewing takes place, the cartridge C1 is submitted to very high mechanical compression forces between the presser plate 78 and the bottom of the channel 98. The clamping jaws 114, which tightly embrace the cartridge, prevent outward bulging of its sidewall, since bulging would lead to a loss of the pressure-tight seal on the upper and lower faces of the cartridge. To further prevent bulging or even crushing of the cartridge, the presser plate 78 has a pair of depending prongs 140. As shown in FIG. 4, when the presser plate 78 is in the lowered condition, the prongs 140 straddle the jaws 114 and firmly engage their outer surfaces 130, thus positively preventing the spreading apart of the jaws.

Means can be provided to manually stop the breawing cycle when a desired amount of beverage has been dispensed. This may happen if the user wishes to have a more concentrated beverage. To this purpose the push-button switch 26 (FIG. 2) may be used to stop the timing cycle of the control unit 138 before the end of the cycle. Also in this case the sequence of events which follow the blocking of the feed conduit 52 is the same as described above.

Referring again to FIG. 4, the water tank 38 may be provided with sensing means 142 in the form of a pair of electrodes near the bottom of the tank 38. When the water level in the tank 38 lowers below the sensing means 142, the current flow across the electrodes can no longer take place and this may be used to prevent the operation of the control unit 138. The low water level may also cause the warning lamp in the push-button switch 26 to extinguish, thus indicating that the tank 38 must be refilled.

I claim:

1. A beverage extracting and dispensing machine for use with cartridges having an imperforate substantially cylindrical sidewall and upper and lower permeable substantially flat walls and containing a brewable product from which a beverage can be obtained by flowing hot water under pressure therethrough, said machine including:

a lower support defining a sliding horizontal path on which the cartridge is adapted to rest and to slide with its lower wall, said sliding path having a leading section adapted to receive a new cartridge to be used, an intermediate brewing station and a trailing edge over which an old cartridge may be dumped after use, an upper presser plate movable to and from said sliding path above said brewing station, said presser plate, when in a lowered position, being adapted to tightly engage the upper wall of a cartridge in the brewing station, and when in a raised position being disengaged from the cartridge, said presser plate having an inlet passage therethrough which opens to the upper permeable wall of the cartridge in the brewing station;

means for lowering the presser plate into engagement with the cartridge in the brewing station, means for forcing hot water under pressure through said inlet passage and through said cartridge in the brewing station, a filling station underlying said support and adapted to receive a container for the beverage, said support having a lower outlet nozzle which communicates with the brewing station through an outlet passage in the support to fill the container in the filling station with the beverage flowing from the lower wall of a cartridge in the brewing station, a pair of movable clamping jaws mounted on said support, one on each side of said sliding path, said clamping jaws having respective concave surfaces adapted to closely embrace the sidewall of a cartridge in the brewing station, and respective bevelled cam surfaces turned towards said leading section of the sliding path and defining therebetween an entrance gap leading to the brewing station, said jaws being resiliently biassed towards each other to a cartridge clamping position and being adapted to be spread apart by the co-operation of the sidewall of a new cartridge with the bevelled cam surfaces when the cartridge is pushed from said leading section to the brewing station through the entrance gap, and said jaws, when spread apart, being adapted to allow an old cartridge to be pushed away from the brewing station and to be dumped over the trailing edge under the thrust of the new cartridge which is pushed to the brewing station, control means operable to control a brewing cycle which includes the successive steps of lowering said presser plate to the lowered position and onto the cartridge in the brewing station, forcing a predetermined amount of hot water under pressure through said cartridge and dispensing a corresponding amount of beverage from said nozzle, and allowing said presser plate to return to the raised position, and sensing means to sense the spread apart condition of said jaws for starting the operation of said control means to accomplish the brewing cycle.

2. A machine as claimed in claim 1, wherein each clamping jaw is hinged on the said support about a respective vertical pivot pin which is located on a respective side of the sliding path and near the leading section of said path.

3. A machine as claimed in claim 2, wherein each of said clamping jaws has associated therewith a hairpin spring, the hairpin springs biassing the jaws towards each other, each hairpin spring having a coiled portion around the pivot pin of the respective jaw and two end portions which are in engagement with the jaw and with a fixed abutment, respectively.

4. A machine as claimed in claim 2, wherein the presser plate has a pair of downwardly projecting prongs which, when the presser plate is in the lowered position, straddle the jaws and are each in engagement with a respective jaw on its side remote from said sliding path to positively prevent the jaws from spreading apart.

5. A machine as claimed in claim 1, wherein said support is a support plate having an upper flat face with a shallow channel therealong which constitutes said sliding path, the width of the channel corresponding to the diameter of the cartridges, and the jaws having lower surfaces which are slidable on respective flat face portions which lie on respective sides of the channel.

6. A machine as claimed in claim 1, wherein the leading section of the sliding path has associated therewith a manually operable pusher member which is movable towards the entrace gap between the jaws to push the cartridge to the brewing station.

7. A machine as claimed in claim 6, wherein the leading section of the sliding path has associated therewith a lever arm an end of which is hinged about a vertical axis on one side of the leading section of the slide path, the other end of the lever arm being in the form of a handgrip and the lever arm having, between its ends, a projection directed towards the entrance gap and constituting said pusher member.

8. A machine as claimed in claim 7, wherein the machine has a cabinet with a front wall which is perpendicular to said sliding path, said front wall having an access window to said leading section of the sliding path, through which window a new cartridge may be placed onto the leading section, and wherein said lever arm constitutes a closure flap for said window, the arrangement being such that the cartridge placed on the leading section is pushed to the brewing station by the pusher member when the flap is moved to the closed position.

* * * * *